United States Patent [19]
Clark et al.

[11] Patent Number: 4,892,984
[45] Date of Patent: Jan. 9, 1990

[54] ROTARY VACUUM-ELECTRICAL CONTROL

[75] Inventors: James F. Clark, Marshall; David J. McFadyen, Paris, both of Ill.; Pradeep K. Mishra, Terre Haute, Ind.

[73] Assignee: TRW Inc., Lyndhurst, Ohio

[21] Appl. No.: 308,242

[22] Filed: Feb. 8, 1989

[51] Int. Cl.$^4$ .................. H01H 9/06; F16K 11/06
[52] U.S. Cl. ............... 200/61.86; 137/624.18; 137/625.46; 200/16 C
[58] Field of Search .............. 251/297; 137/624.18, 137/625, 625.11, 624.19, 625.46, 625.48; 200/16 C, 11 DA, 11 J, 81 H, 335, 61.86, 61.87

[56] References Cited

U.S. PATENT DOCUMENTS

| | | | |
|---|---|---|---|
| 3,122,616 | 2/1964 | Rice | 137/625.46 |
| 3,237,644 | 2/1966 | Beck | 137/624.18 |
| 3,637,962 | 1/1972 | Fiddler et al. | |
| 3,721,779 | 3/1973 | Raab | |
| 3,824,356 | 7/1974 | Fiddler | 200/61.86 |
| 3,856,045 | 12/1974 | Kenny et al. | |
| 4,251,698 | 2/1981 | Raab | 200/61.86 |

Primary Examiner—Gerald P. Tolin
Attorney, Agent, or Firm—Tarolli, Sundheim & Covell

[57] ABSTRACT

A rotary vacuum-electrical switch controller is particularly applicable for use in an automatic temperature control system in a motor vehicle for selectively interconnecting various vacuum and electrically operated accessories with a vacuum source or an electrical source. The controller includes a valve body including a valve seat having a generally flat circular surface with a plurality of valve ports formed therein. A plurality of valve nipples are connected to the valve ports and the nipples extend from the valve body for connection to a vacuum source and vacuum control devices. A disc-shaped valve plate has a circular surface which faces the valve seat and has a plurality of chambers defined therein by peripherally encompassing radially and circumferentially extending walls. The chambers selectively interconnect various of the ports as the valve plate is rotated. A rotor is coaxially aligned with the valve plate and has a first end with means for engaging the valve plate for rotating the valve plate about its axis of rotation. An electrical switch body is provided with a generally flat surface having a plurality of electrical leads mounted thereon. A disc-shaped electrically conductive switch plate is interposed between a second end of the rotor and the switch body. The rotor has means for drivingly engaging the switch plate so that as the rotor is rotated about its axis of rotation, the switch plate is rotated along with the valve plate with the switch plate selectively interconnecting various of the electrical leads as it is rotated.

24 Claims, 5 Drawing Sheets

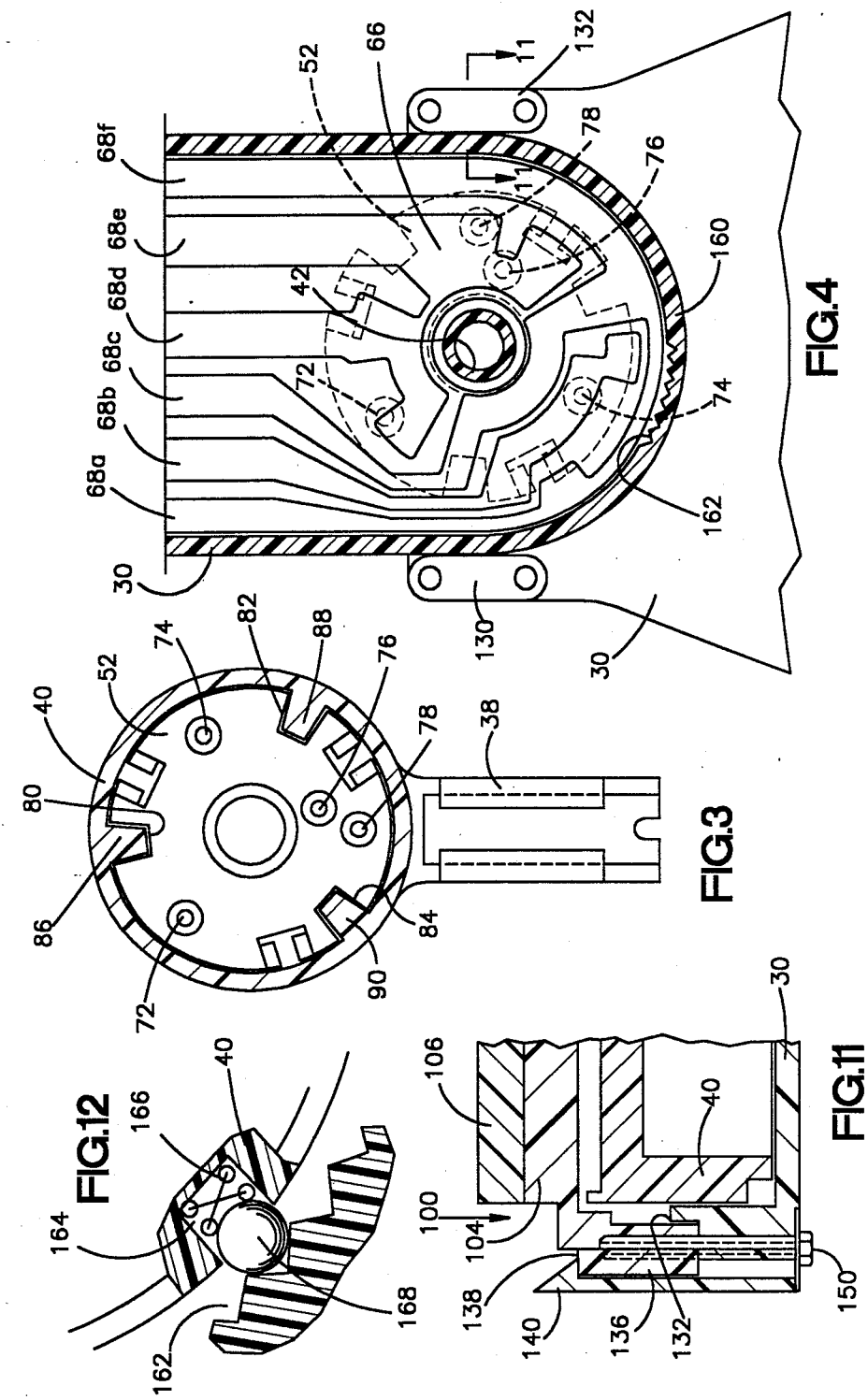

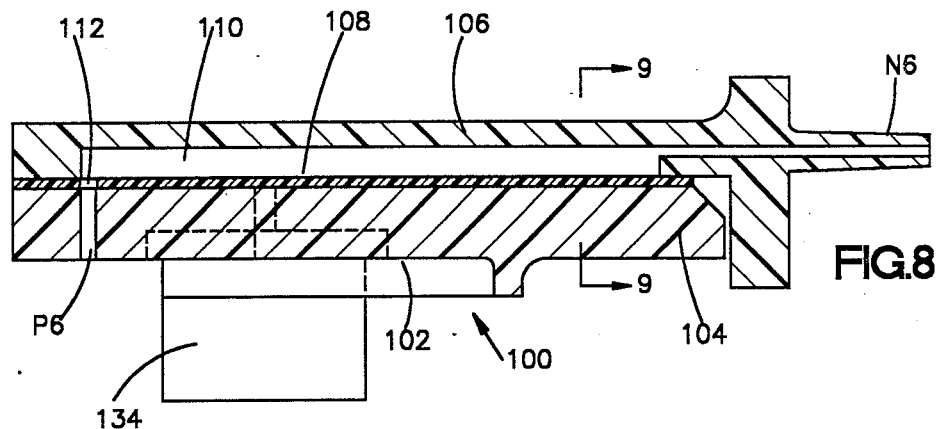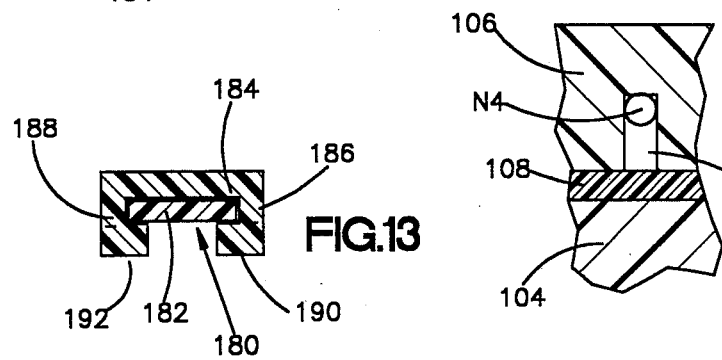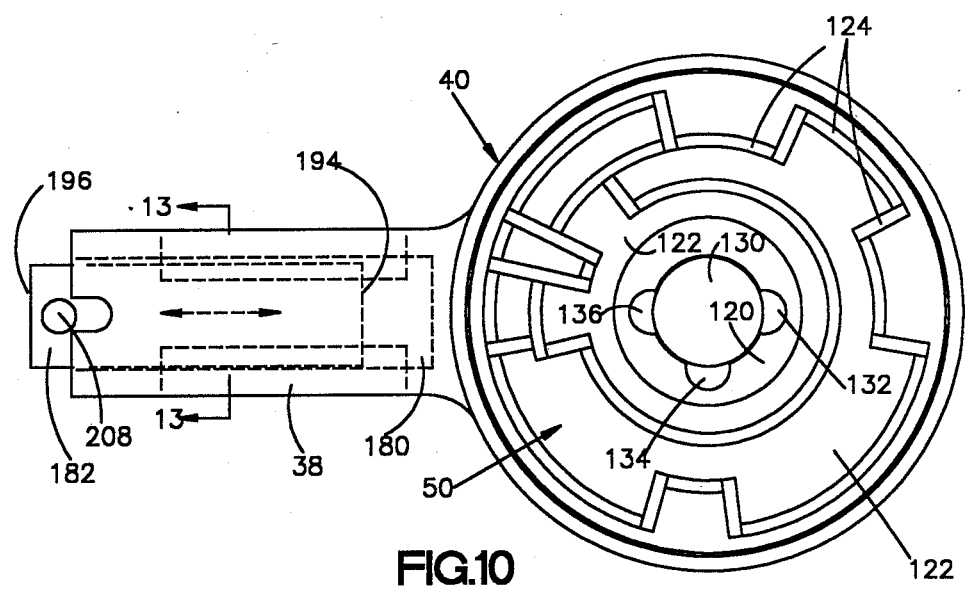

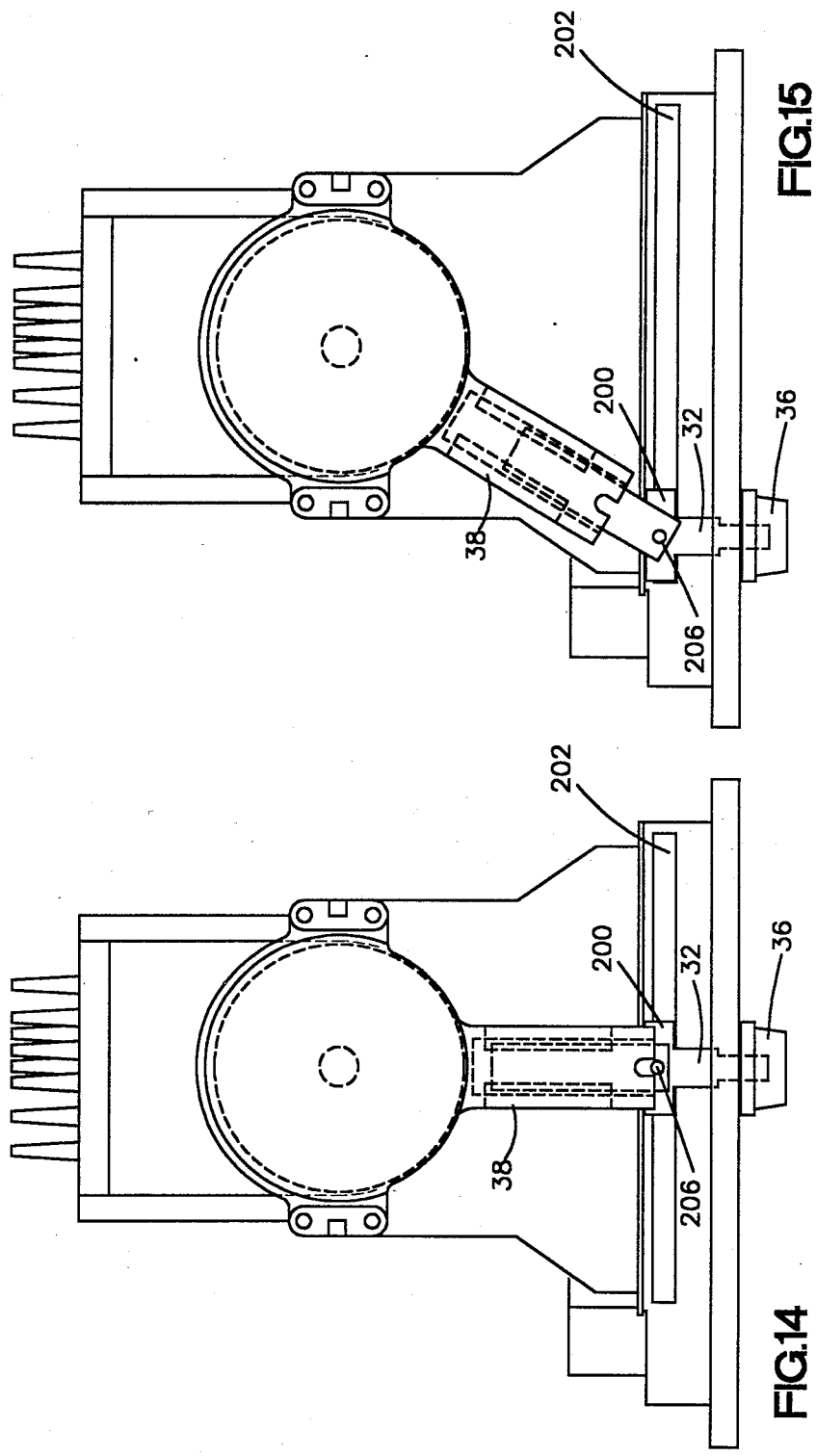

ROTARY VACUUM-ELECTRICAL CONTROL

BACKGROUND OF THE INVENTION

This invention relates to a control mechanism particularly applicable for use in a temperature control system in a motor vehicle wherein the control mechanism selectively interconnects various vacuum and/or electrically operated accessories with a vacuum source or an electrical source.

A typical temperature control system for a passenger vehicle serves to control flow and condition of air inside the vehicle by manual linear displacement of two actuators available to the vehicle operator. One of the actuators is a vacuum valve-electrical circuit actuator and the other is a heater temperature control actuator. Displacement of the heater temperature control actuator controls the temperature of the air blown into the vehicle.

The vacuum valve-electrical circuit actuator travels back and forth on the dashboard through several detent positions. This provides selective connection between a vacuum source port and one or more valve ports. It also provides selective connection between the vehicle battery and one or more electrical circuits. The valve ports are connected to individual vacuum motors which operate various vanes to open and close air ducts. The electrical circuits are connected to various electrical control devices, such as an electrically operable air conditioning clutch and the like.

Such control mechanisms include a valve body which typically has a flat surface with a plurality of ports, each communicating with various vacuum inlets and outlets. A valve plate faces the flat surface and has a plurality of chambers defined therein by peripheral walls which extend toward and abut the flat surface. One of the ports serves as a vacuum port and is connected to a vacuum source and the other ports connect to various vacuum motors to operate various vanes and the like. When the valve plate is displaced relative to the valve body, the vacuum port is selectively connected to one or more of the other ports to provide the desired control of air flow and condition.

The U.S. Pat. Nos. to A. Kenny et al. 3,856,045 and T. Fiddler et al. 3,637,962 disclose control mechanisms similar to that as described above wherein a rotor drives a valve plate relative to a valve body to provide the selective interconnections of the ports while at the same time actuating electrical switches to complete electrical circuits. Both Kenny and Fiddler propose that the rotor be provided with camming mechanisms which rotate with the rotor and in so doing cam against and actuate various switches located around the periphery of the rotor to cause various electrical circuits to be opened or completed. Neither Kenny nor Fiddler suggest that the rotor drive both a valve plate for interconnecting valve ports as well as an electrical switch plate for interconnecting various electrical leads, as opposed to the peripheral switch actuating camming mechanisms employed.

Each actuator of such control mechanisms in a motor vehicle typically includes a lever arm that protrudes through a slot on a face plate mounted on the vehicle's dashboard. A control knob is mounted on the end of the lever arm. The control knob may be manually displaced along a linear path through selected detent positions. The vacuum valve-electrical switch actuator may have detent positions such as OFF, MAX and NORM (for maximum and normal air conditioning operations). Additional positions may be VENT, FLOOR and DEF (for defrost). It is important that the control knob of such an actuator move along a linear path parallel to the face plate on the dashboard, as opposed to an arcuate path, for passenger safety reasons. This linear movement of the control knob affects the design of the actuator lever arm. For example, the U.S. Pat. No. to A. F. Raab 3,721,779 employs an actuator arm having a control linkage wherein the lever arm is rotatable and slidable about a pivot post so that as the operator displaces the control knob along a linear path in front of the face plate on the dashboard, the actuator arm pivots about and slides relative to the pivot post. The actuator lever arm is, in turn, in engagement through a linkage mechanism with a slidable carriage which is displaced to various positions at which electrical circuits are completed.

There is, however, no teaching in the Raab patent of an actuator lever arm mechanism which serves as a linear-to-rotary converter. Moreover, Raab does not suggest telescoping movement of a tongue into and out of a channel located on the rotor arm so that as the control knob is linearly displaced, the tongue slides into and out of the channel while driving the rotor arm in an angular manner about its axis of rotation. The use of such a structure will permit the tongue to be a totally separate element to be coupled to the rotor arm only when the control mechanism is in place behind the face plate on the dashboard. Also, the tongue of such an arrangement may be assembled to the face plate rather than the rotor structure.

SUMMARY OF THE INVENTION

In accordance with one aspect of the present invention, a rotary control mechanism is provided which has a valve body including a stator member having a generally flat first circular surface and having a plurality of valve ports therein. A plurality of valve nipples extend from the valve body for connection to a vacuum source and vacuum control devices. Each of the valve ports is connected to a respective one of the nipples. A disk-shaped valve plate has a second circular surface facing the first surface and is mounted so as to be coaxial therewith. The valve plate has a plurality of chambers defined therein by peripherally encompassing radially and circumferentially extending walls for selectively interconnecting various of the ports as the valve plate is rotated about its axis of rotation. A rotor is coaxially aligned with the valve plate and has a first end with means for engaging the valve plate for rotating the valve plate about its axis of rotation. An electrical switch body is provided having a stator member including a generally flat surface which has a plurality of electrical leads mounted thereon. A disk-shaped electrically conductive plate is interposed between a second end of the rotor and the switch body. The rotor's second end is drivingly interconnected with the switch plate so as to drive the switch plate about its axis of rotation. The switch plate carries means for selectively interconnecting various of the electrical leads as it is being rotated.

In accordance with another aspect of the invention, a rotor arm extends radially outward from the rotor for imparting rotational forces to the rotor about the axis of rotation. The rotor arm has a radially extending channel formed therein. An elongated tongue is slidably carried by the arm within the channel. The tongue has a first end and a second end with the first end being normally located with the channel, and the second end telescopes into and out of the channel as the tongue slides radially inward and outward thereof. In this manner, the second end may be displaced by manual forces, as with a control knob, along a linear path located in a plane spaced from and parallel to the axis of rotation causing telescopic movement of the tongue within the channel to convert linear movement of the second end of the tongue into rotational movement of the rotor.

BRIEF DESCRIPTION OF THE DRAWINGS

The foregoing and other advantages of the present invention will become apparent to those skilled in the art to which the present invention relates from reading the following specification with reference to the accompanying drawings, wherein:

FIG. 3 is a sectional view taken along line 3—3 looking in the direction of the arrows in FIG. 2 and illustrating the switch plate superimposed on the rotor;

FIG. 4 is a sectional view taken along line 4—4 looking in the direction of the arrows in FIG. 2 illustrating the head body and electrical leads therein together with the switch plate of FIG. 3;

FIG. 8 is a sectional view taken through the valve body in FIG. 5 and looking in the direction of the arrows;

FIG. 9 is a sectional view taken along line 9—9 in FIG. 8 and looking in the direction of the arrows;

FIG. 10 is an enlarged view taken generally along line 10—10 looking in the direction of the arrows in FIG. 2;

FIG. 11 is a sectional view taken generally along line 11—11 in FIG. 4 looking in the direction of the arrows;

FIG. 12 is a fragmentary enlarged view taken from FIG. 4;

FIG. 13 is a sectional view taken along line 13—13 looking in the direction of the arrows in FIG. 10;

FIG. 14 is a view taken along line 14—14 looking in the direction of the arrows in FIG. 2; and FIG. 15 is a view similar to that of FIG. 14 but showing the rotor arm in a displaced position.

DESCRIPTION OF A PREFERRED EMBODIMENT

Figure 1:
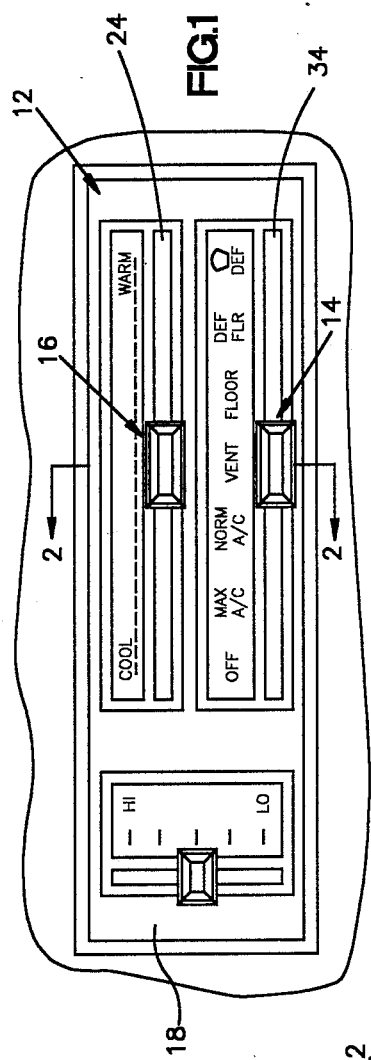
FIG. 1 is a front elevational view showing a temperature control system face plate on a vehicle dashboard.
Figure 2:
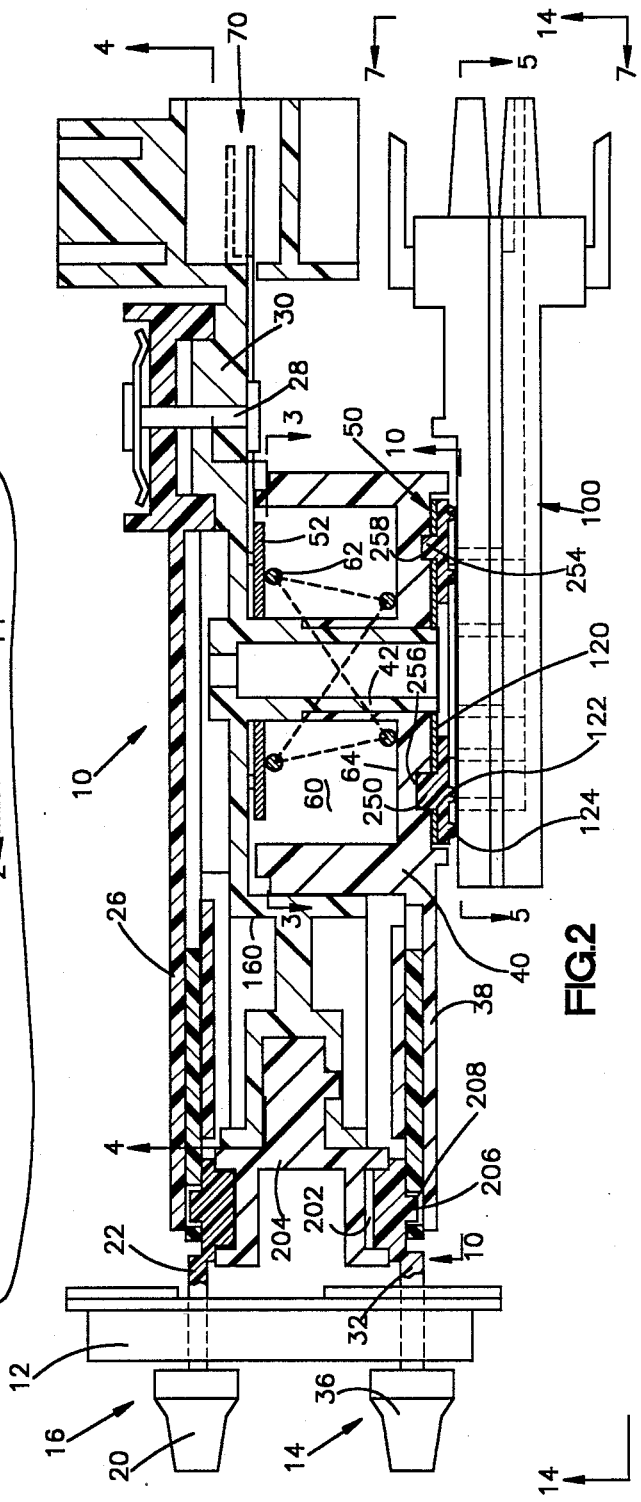
FIG. 2 is a side elevational view, partly in section, illustrating the control system construction in accordance with a preferred embodiment of the present invention.
Figure 5:
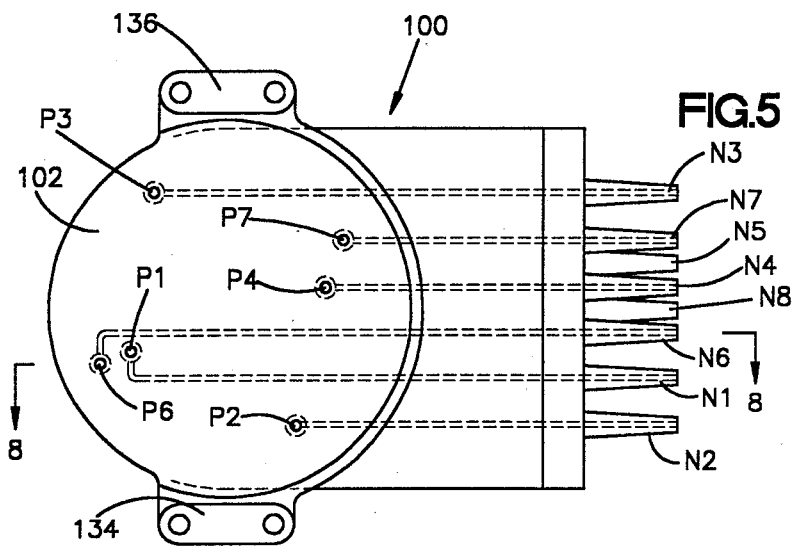
FIG. 5 is a view of the valve body taken along line 5—5 in FIG. 2 looking in the direction of the arrows.

Reference is now made to the drawings which illustrate a preferred embodiment of the invention only and not for purposes of limiting same. As shown in FIGS. 1 and 2, the control system includes a control head 10 adapted to be mounted behind a vehicle dashboard and secured thereto to a face plate 12 mounted on the dashboard within view of a vehicle operator. The controls available to the operator in the vehicle include a vacuum valve actator 14, a heater temperature actuator 16 and a fan control actuator 18. As is known, the fan control actuator 18 is a multi-position electrical switch which serves to control the speed of a blower fan. As this forms no part of the present invention, no further discussion will be given thereof.

Displacement of the heater temperature control actuator 16 controls the temperature of the air blown into the vehicle. This actuator includes a control knob 20 mounted on the end of a lever arm 22 which extends through a horizontal slot 24 in the front panel 12 on the dashboard. The lever arm 22 drives a rotor arm 26 which pivots about a pivot post 28 mounted in the control head body 30. The rotor arm 26 is interconnected by means of a cable with an operating mechanism, not shown, for regulating the temperature of the air blown into the vehicle. As is well known in the art, selection is made by the operator by displacing the control knob 16 along a horizontal path between COOL and WARM positions.

Attention is now more specifically directed to the actuator 14. This actuator includes a lever arm 32 which extends through a horizontal slot 34 in the face plate 12 with a control knob 36 being secured to the end of the arm. The lever arm 32 is interconnected with a rotor arm 38 which serves to drive a rotor 40 about a rotor post 42 extending from the head body 30. The vehicle operator may engage the control knob 36 and slide it in a straight line across the face of the face plate 12 through seven positions shown in FIG. 1. These include OFF, MAX-A/C, NORM-A/C, VENT, FLOOR, DEF-FLR, AND DEF. At each of these positions, preferably detent positions, various vacuum and electrical circuits are completed or not completed for purposes of controlling flow and condition of air inside the vehicle.

The rotor 40 and its rotor arm 38 are integral units preferably constructed of molded plastic. The rotor is essentially a cylindrical shaped body having a central circular shaped aperture so that the rotor may be slidably received by the cylindrical shaped rotor post 42 extending from the head body 30. At its lower end, as shown in FIG. 2, the rotor carries a disc-shaped valve plate 50 for rotation therewith about the rotor post 42. At its upper end, as viewed in FIG. 2, the rotor 40 carries a disc-shaped electrical plate 52 for rotation therewith about the rotor post 42. As will be observed in the description which follows, as the rotor is rotated about the rotor post 42, the valve plate 50 completes various vacuum circuits while the switch plate 52 completes various electrical circuits.

Reference is now made to FIGS. 3 and 4 wherein FIG. 3 is a view looking down in FIG. 2, at the top of switch plate 52 carried by the rotor 40 and FIG. 4 is a view looking upward in FIG. 2, with the switch plate 52 being superimposed. As can be seen from FIGS. 2 and 3, the rotor 40 has an annular recess 60 which surrounds the rotor post 42. A coil spring 62 is located in the recess 60 and coaxially surrounds the rotor post. One end of the coil spring 62 is seated on the floor 64 of recess 60. The other end of the coil spring bears against the bottom surface of the switch plate 52 to resiliently urge the switch plate up against the head body 30. In this area, the head body 30 has a somewhat circular surface 66, as shown in FIG. 4. Six electrical leads 68a, 68b, 68c, 68d, 68e, and 68f are secured to a flat surface of the head body as it faces switch plate 52 with the electrical leads extending into the area of surface 66. These electrical leads extend within the control head into a terminal socket 70, as shown in FIG. 2. An electrical connector may be connected to the electrical leads for interconnecting these leads with the battery and various electrical circuits used in conjunction with the air control system. The switch plate 52 serves to interconnect various of these leads so as to complete various electrical circuits as the switch plate 52 is driven by the rotor 40 about the rotor post 42.

The switch plate 52 is preferably constructed of an electrically conductive material, such as copper, and has a plurality of bosses 72, 74, 76 and 78 which extend upwardly toward the circular surface 66 for bearing against and making electrical connection with the electrical leads. For example, in the position illustrated in FIG. 4, boss 72 is connected to lead 68d, bosses 76 and 78 are connected to electrical lead 68e and boss 74 is connected to electrical lead 68b. Consequently, leads 68b, 68d and 68e are all electrically connected together by the switch plate.

As best seen in FIG. 3, the switch plate has three radially extending slots 80, 82 and 84 extending inwardly from its periphery. These slots serve to respectively receive flanges 86, 88 and 90 which extend radially inward from the walls of rotor 40. These flanges and slots are located so that the switch plate will be carried by the rotor 40 only in the orientation as illustrated in FIG. 3 for correct alignment with respect to the electrical leads. These flanges and slots provide correct alignment and also provide a means for driving engagement between the rotor 40 and the switch plate so that the switch plate is driven about rotor post 42 as the rotor 40 is driven about the rotor post while the spring 62 resiliently urges the switch plate so that the bosses 72 through 78 will bear against various of the electrical leads 68a through 68f.

Reference is now made specifically to FIG. 2 in conjunction with FIGS. 5-9 which illustrate in detail the vacuum housing 100. Housing 100 includes a generally circular-shaped valve seat 102 which provides a flat circular surface for receiving the disc-shaped valve plate 50 in coaxial alignment therewith. The valve seat has a plurality of ports located therein and this includes ports P1, P2, P3, P4, P6, and P7. These ports in the valve seat 102 are respectively in fluid communication with nipples N1, N2, N3, N4, N6 and N7. These nipples, as viewed in FIGS. 2 and 7, extend from the control head so that they may be connected to an adapter for communicating each nipple with a vacuum source or vacuum operated device. In this embodiment, nipple N4 is intended to be connected to the vacuum source. Nipples N5 and N8 are dummy nipples and are employed for providing structural rigidity for connection with a vacuum adapter.

The valve body 100, best seen in FIGS. 2, 8 and 9, is a three piece structure including an upper member 104 which includes the valve seat 102, discussed previously, a lower member 106, and a sealing gasket 108. The lower member has a plurality of rectangular channels formed therein each communicating with one of the ports and a selected one of the nipples. In the example of FIGS. 8 and 9, a rectangular-shaped channel 110 is formed in the lower member 106 to extend from port P6 to the nipple N6. The side walls of the channels isolate the various channels from each other and the open ends of the channels are sealed by means of a gasket 108. A hole 112 is formed in the gasket so that the channel 110 may communicate with its port P6 which extends through the upper member 104 and the valve seat 102. Consequently, each of the ports in the valve seat of FIG. 5 communicates with its respective nipple in such a manner that the communication is isolated from the rest of the ports and nipples. The gasket 108 is preferably secured to the upper member 104 and the lower member 106 as with a suitable adhesive to maintain isolation between the various vacuum channels 110.

Figure 6:
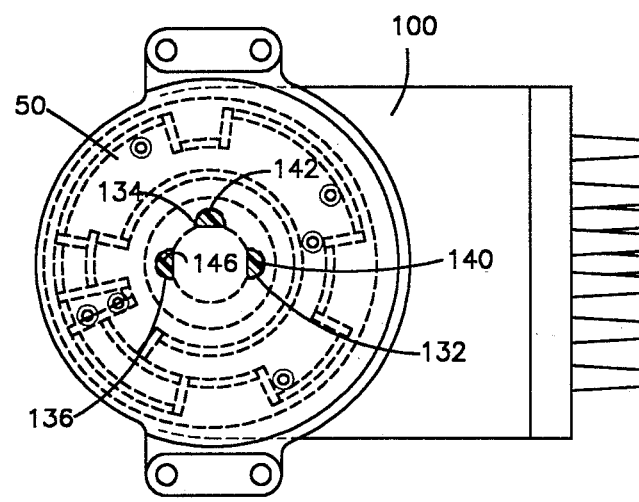
FIG. 6 is a view similar to that of FIG. 5 showing the valve plate superimposed thereon.
Figure 7:
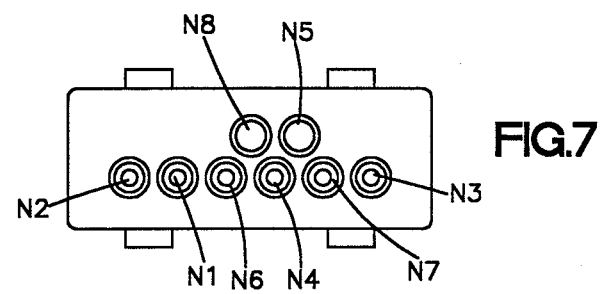
FIG. 7 is an end view taken along line 7—7 looking in the direction of the arrows in FIG. 2 and showing the arrangement of the valve nipples.

Reference is now made to FIGS. 2, 6 and 10 relative to the valve plate 50. FIG. 10 is a view taken generally along line 10—10 looking in the direction of the arrows in FIG. 2. The valve plate 50 is comprised of the disk-shaped metal backup plate 120 and a silicon rubber selector plate 122 molded thereto and aligned so as to be coaxial therewith. The selector plate 122 is provided with radially and circumferentially extending double-beaded ribs which extend toward the valve seat 102 on the valve body 100. These double-beaded walls serve to peripherally encompass various valve chambers between plate 122 and the valve seat 102, as is shown by the valve chambers in FIG. 10. The backup plate 120 has a central aperture 130 therein. This aperture is provided with radially outwardly extending arcuate-shaped alignment slots 132, 134 and 136. These alignment slots in the backup plate 120 serve to receive three alignment bosses 140, 142 and 146, respectively, which extend from the rotor 40 through the slots. This is shown more clearly in FIG. 6 wherein the valve plate 50 is shown in dotted lines as it is superimposed over the valve seat 102. These bosses, in addition to providing correct alignment of the valve plate and hence of the various valve chambers, also serve to provide a driving connection between the rotor and the valve plate so as to drive the valve plate about the rotor post 42.

In this embodiment, port P4 is the vacuum port and its nipple N4 is connected to the vacuum source. As the valve plate is rotated, the valve chambers interconnect the valve port P4 with various of the other ports and thereby connect individual vacuum motors which operate the various vanes to open and close the ducts. In a similar manner, as the switch plate 52 is rotated by the rotor, electrical connections are made from the battery to such electrical items as the clutch coil and compressor. An example is given below as to various positions of the vacuum actuator 14 relative to the legends on the front panel illustrated in FIG. 1. This is presented below in Table I.

TABLE I

| | |
|---|---|
| OFF | Ports 1, 3 and 7 are connected to Port 4 which is the vacuum source. Port 2 is vented to atmosphere. A/C clutch and blower circuits are in off position. |
| MAX A/C | Ports 1, 2, 3 ad 7 are connected to source Port 4. A/C clutch, blower and CELO circuits are connected to battery. |
| A/C | Ports 2, 3 and 7 are connected to vacuum source. Port 1 is vented to atmosphere. Electrical circuits are similar to that in Max A/C. |
| VENT | Vacuum circuits remain same as in A/C mode. Blower and CELO electrical circuits are on. A/C clutch circuit is at off position. |
| FLOOR | Port 1 and Port 6 are interconnected. Port 2 is vented to atmosphere. Ports 3 and 7 are connected to vacuum. Only blower electrical circuit is on. |
| DEF/FLR | Ports 1, 2 and 3 are vented to atmosphere. Port 7 is connected to vacuum. All electrical circuits are on. |
| DEFROST | Ports 1, 2, 3 and 7 are vented to atmosphere. All electrical circuits are on. |

Reference is now made specifically to FIGS. 2, 4, 5, 6 and 11 relative to the manner in which the valve body housing 100 is fastened and secured to the head body 30. FIG. 11 is a view taken generally along line 11—11 looking in the direction of the arrows in FIG. 4 but with the rotor 40 and valve body housing 100 included. As shown in FIG. 4, the head body 30 has elongated side slots 130 and 132 formed therein. These are configured for respectively receiving side mounts 134 and 136 which extend from the valve body 100. One of the side mounts 134 is shown in greater detail in FIG. 8. As shown in FIG. 11, the side mount 136 is received in place within slot 132. Side mount 136 is shown as having a lock surface 138 which is engaged by a resilient fastening member 40 extending from the head body 30. In assembly with the rotor in place, the head body 30 and the valve body 100 are snapped together. The side mounts of the valve body are received in place in the side slots in the head body 30 and are resiliently held in place by means of the fastening elements 140 engaging surfaces 138. Additional fastening may be achieved with the use of threaded bolts, such as bolt 150, which extends through the head body 30 and is screwed into side mount 136 of the valve body 100.

Reference is now made to FIGS. 4 and 12 relative to the detent positioning of the rotor 40 relative to the head body 30. As shown in FIGS. 2 and 4, the head body 30 has a semi-circular wall 160, which, in part, serves to define the circular switch surface 66 discussed hereinbefore with reference to FIG. 4. The inner surface of wall 160 is provided with seven detents 162 representative of the seven detent positions shown on the face plate 12 in conjunction with actuator 14 in FIG. 1. FIG. 12 is a fragmentary view of a portion of wall 160 illustrating detents 162 as well as showing the rotor 40 in place. As seen, the rotor is provided with a radially extending recess 164 containing a coil spring 166 which serves to resiliently bias a steel ball 168 against the detents 162. Consequently, as the rotor is displaced about the rotor post 42, the ball 168 will be resiliently biased against the detents to cause disrupted or detented movement so that the operator will pause at each of the detent positions to select the correct position of the control knob 36 relative to the intended air control function.

Reference is now made more specifically to FIGS. 10, 13, 14 and 15 relative to the manner in which the lever arm 32 interconnects with the rotor arm 38 for providing the transition of linear movement of the control knob 36 to rotational movement of the rotor 40. As seen in FIGS. 10 and 13, the rotor arm 38 has an elongated rectangular-shaped radially extending channel 180 formed therein for slidably receiving an elongated tongue 182. The channel 180 has a relatively flat rectangular-shaped floor 184 bordered by elongated vertically extending side walls 186 and 188. These side walls are spaced from each other slightly greater than the width of tongue 182 so as to provide guidance for the tongue as it telescopes in and out of the channel 180. The structure includes a tongue retaining means taking the form of inwardly extending walls 190 and 192 which extend inwardly from the vertical side walls 186 and 188. These inwardly extending walls 190 and 192 are vertically spaced from the floor 184 by a distance sufficient to permit tongue 182 to telescope in and out of the channel 180.

As best seen in FIG. 10, the tongue 182 has a proximal end 194 which remains within the channel as the tongue telescopes and a distal end 196. The distal end 196 of the tongue 182 may be driven in a linear direction in a plane spaced from and parallel to the axis of rotation of rotor 40, causing rotary movement of the rotor arm 38 as the tongue bears against the side walls 186 and 188 as it telescopes outwardly from the channel. The rotor arm rotates the rotor 40 about its axis of rotation. The distal end 196 of the tongue 182 may be driven in such a linear manner by interconnecting the control knob 36 and the distal end of the tongue in a manner to be discussed hereinafter with reference to FIGS. 14 and 15.

As shown in FIGS. 2, 14 and 15, the lever arm 32 is connected to a T-slide 200 arranged to be received for sliding movement in a linear track 202 formed in an insert member 204 mounted on the control head 30, as shown in FIG. 2. The T-slide 200 has a pivot post 206 extending vertically therefrom and which post is received within a circular aperture 208 located in the tongue adjacent its distal end 196. Consequently, as the operator displaces the control knob, it will move in a linear manner as the T-slide 200 is guided in its movement by track 202. This linear motion of the T-slide will be imparted to the distal end of the tongue 182 by virtue of the pivot connection. As discussed previously, as the distal end of the tongue is being linearly displaced, it will impart rotational movement to the rotor arm 38 thereby driving the rotor 40 about the rotor post 42. The connection between lever arm 22 and the temperature control actuator arm 26 is accomplished in the same manner as that discussed above.

Whereas the invention has been described in conjunction with a preferred embodiment, it is to be understood that various modifications may be made without departing from the spirit and scope of the invention as defined by the appended claims.

Having described a preferred embodiment of the invention, the following is claimed:

1. A rotary vacuum-electrical switch controller, comprising:

a valve body including a valve seat having a generally flat first circular surface and having a plurality of valve ports therein, a plurality of valve nipples extending from said body and adapted for connection to a vacuum source and vacuum control devices and means for connecting each of said ports with a respective one of said nipples;

a disk-shaped valve plate having an axis of rotation and having a second circular surface facing said first surface and being coaxial therewith and having a plurality of chambers defined therein by peripherally encompassing radially and circumferentially extending walls for selectively interconnecting various of said ports as said valve plate is rotated about said axis of rotation;

a rotor having first and second ends and being coaxially aligned with said valve plate, said first end having means for engaging said valve plate for rotating said valve plate about said axis of rotation;

an electrical switch body including a stator member having a generally flat surface having a plurality of electrical leads mounted thereon;

a disk-shaped electrically conductive switch plate interposed between the second end of said rotor and said switch body and being coaxially aligned with said rotor, the second end of said rotor having means for drivingly engaging said switch plate so as to drive said switch plate about said axis of rotation, said switch plate having means for selectively interconnecting various of said electrical leads as it is rotated about said axis of rotation.

2. A controller as set forth in claim 1 wherein said switch plate has a plurality of projections which face toward said plurality of leads on said stator member and which selectively engage various of said leads as said rotor is driven about said axis of rotation.

3. Apparatus as set forth in claim 2 wherein said electrical switch body has a cylindrical post extending vertically from said switch body stator member, said post being coaxially aligned with said axis of rotation.

4. A controller as set forth in claim 3 wherein said disk-shaped switch plate has a central aperture for receiving said post so that said switch plate may be rotationally driven about said post.

5. Apparatus as set forth in claim 4 wherein said rotor has a central aperture coaxially aligned with said axis of rotation and being of a diameter sufficient to slidably receive said post so that said rotor may be rotated about said post.

6. A controller as set forth in claim 5 wherein said rotor carries spring means for resiliently biasing said switch plate toward said stator member.

7. A controller as set forth in claim 1 including a rotor arm extending radially outward from said rotor for imparting rotational forces to rotate said rotor about said axis of rotation and thereby rotate both said switch plate and said valve plate about said axis of rotation.

8. A controller a set forth in claim 7 wherein said rotor arm has a radially extending channel formed therein, an elongated tongue slidably carried by said arm within said channel and having a first end and a second end with said first end being normally located within said channel and said second end telescoping into and out of said channel as said tongue slides radially inward and outward thereof such that said second end may be displaced by manual forces along a linear path located in a plane spaced from and parallel to said axis of rotation causing telescopic movement of said tongue in said channel to convert linear movement of said second end into rotational movement of said rotor about said axis of rotation.

9. A controller as set forth in claim 8 wherein said channel includes an elongated flat recess floor formed in said arm and having spaced apart side walls extending perpendicularly from said flat floor and wherein said tongue is an elongated rectangular member having a width slightly less than the spacing between said side walls.

10. A controller as set forth in claim 9 including tongue retaining means for retaining said tongue in said channel.

11. A controller as set forth in claim 10 wherein said tongue retaining means includes wall means extending inwardly from each of said side walls and spaced from said flat recess floor by a distance sufficient to permit the tongue to slide in and out of said channel without becoming dislodged therefrom in a direction away from said recess floor.

12. A rotary vacuum switch controller comprising:
a valve body including a valve seat having a generally flat circular first surface and having a plurality of valve ports therein, a plurality of valve nipples extending from said body adapted for connection to a vacuum source and vacuum control devices, and means for connecting each of said ports with a respective one of said nipples;

a disk-shaped valve plate having an axis of rotation and having a second circular surface facing said first surface and being coaxial therewith and having a plurality of chambers defined therein by peripherally encompassing radially and circumferentially extending walls for selectively interconnecting various of said ports as said valve plate is rotated about its axis of rotation;

a rotor coaxially aligned with and in engagement with said valve plate for rotating said valve plate about said axis of rotation; and a rotor arm extending radially outward from said rotor for imparting rotational forces to rotate said rotor about said axis of rotation, said arm having a radially extending channel formed therein, an elongated tongue slidably carried by said arm in said channel and having a distal end and a proximal end, said proximal end being located within said channel and said distal end telescoping into and out of said channel as said tongue slides radially inward and outward thereof so that said distal end may be displaced by manual forces along a linear path located in a plane spaced from and parallel to said axis of rotation for causing telescopic movement of said tongue into and out of said channel and thereby convert linear movement of said distal end of said tongue into rotational movement of said rotor about said axis of rotation.

13. A controller as set forth in claim 12 wherein said channel extends for a length at least equal to the length of said tongue.

14. A controller as set forth in claim 13 wherein said channel extends for a length which is greater than the length of said tongue.

15. A controller as set forth in claim 12 wherein said channel includes an elongated flat recess floor formed in said arm and having spaced apart side walls extending perpendicularly from said flat recess floor.

16. A controller as set forth in claim 15 wherein said tongue is an elongated rectangular member having a width slightly less than the spacing between said side walls.

17. A controller as set forth in claim 16 including tongue retaining means for retaining said tongue in said channel in a manner to prevent said tongue from substantial movement in a direction away from said recess floor while permitting sliding telescopic movement of said tongue into and out of said channel.

18. A controller as set forth in claim 17 wherein said tongue retaining means includes retaining walls extending inwardly from each of said side walls and spaced from said flat recess floor by a distance sufficient to permit said tongue to slide in and out of said channel.

19. A controller as set forth in claim 12 wherein said rotor has first and second axially spaced ends with said first end being coaxially aligned with said valve plate and having means for engaging said valve plate for driving said valve plate about said axis of rotation, an electrical switch body including a stator member having a generally flat surface having a plurality of electrical leads mounted thereon, a disk-shaped electrically conductive plate interposed between said second end of said rotor and said switch body and being coaxially aligned with said rotor, said second end of said rotor having means for drivingly engaging said switch plate so as to drive said switch plate about said axis of rotation, said switch plate having means for selectively interconnecting various of said electrical leads as it is being rotated about said axis of rotation.

20. A controller as set forth in claim 19 wherein said switch plate has a plurality of projections which face toward said plurality of leads on said stator member and which selectively engage various of said leads as said rotor is driven about said axis of rotation.

21. Apparatus as set forth in claim 20 wherein said electrical switch body has a cylindrical post extending vertically from said switch body stator member, said post being coaxially aligned with said axis of rotation.

22. A controller as set forth in claim 21 wherein said disk-shaped switch plate has a central aperture for receiving said post so that said switch plate may be rotationally driven about said post.

23. Apparatus as set forth in claim 22 wherein said rotor has a central aperture coaxially aligned with said axis of rotation and being of a diameter sufficient to slidably receive said post so that said rotor may be rotated about said post.

24. A controller as set forth in claim 23 wherein said rotor carries spring means for resiliently biasing said switch plate toward said stator member.

* * * * *